United States Patent
Yang et al.

(10) Patent No.: US 8,737,051 B2
(45) Date of Patent: May 27, 2014

(54) DISPLAY SEAL FOR ELECTRONIC DEVICE

(75) Inventors: Nai-Lin Yang, New Taipei (TW); Hai-Bo Li, Shenzhen (CN); Wei Gong, Shenzhen (CN); Min Zhuo, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 165 days.

(21) Appl. No.: 13/327,471

(22) Filed: Dec. 15, 2011

(65) Prior Publication Data

US 2012/0320553 A1 Dec. 20, 2012

(30) Foreign Application Priority Data

Jun. 20, 2011 (CN) .......................... 2011 2 0208126

(51) Int. Cl.
*H04M 9/00* (2006.01)
*H04M 1/02* (2006.01)
*G06F 1/16* (2006.01)

(52) U.S. Cl.
CPC ........... *H04M 1/0266* (2013.01); *G06F 1/1637* (2013.01); *G06F 1/1656* (2013.01)
USPC ................................ 361/679.26; 379/433.04

(58) Field of Classification Search
CPC ... H04M 1/0266; G06F 1/1637; G06F 1/1656
USPC ..................................................... 361/679.26
See application file for complete search history.

(56) References Cited

U.S. PATENT DOCUMENTS

| | | | |
|---|---|---|---|
| 6,682,674 B2 * | 1/2004 | Sandevi et al. | 264/135 |
| 2007/0049068 A1 * | 3/2007 | Yanagida | 439/76.1 |

* cited by examiner

*Primary Examiner* — Ramon Barrera
(74) *Attorney, Agent, or Firm* — Novak Druce Connolly Bove + Quigg LLP

(57) ABSTRACT

An electronic device includes a cover and a display module mounted on the cover, the cover includes a cover body and a seal gasket molded on the cover body, the seal gasket is molded from thermosetting rubber. The seal gasket is permanently clamped between the cover body and the display module.

9 Claims, 3 Drawing Sheets

DISPLAY SEAL FOR ELECTRONIC DEVICE

BACKGROUND

1. Technical Field

The disclosure generally relates to covers, and particularly to covers used in electronic devices.

2. Description of the Related Art

Electronic devices (e.g. mobile phone) may include a front cover and a display module. A sealing member may be positioned between the front cover and display module for preventing the ingress of dirt and moisture and other contaminants. However, if the mounting of the seal member is done manually, the performance of the seal may not be good, nor will the seal be long-lasting.

Therefore, there is room for improvement within the art.

BRIEF DESCRIPTION OF THE DRAWINGS

Many aspects of the exemplary cover for electronic device can be better understood with reference to the following drawings. The components in the various drawings are not necessarily drawn to scale, the emphasis instead being placed upon clearly illustrating the principles of the exemplary cover for electronic device. Moreover, in the drawings, like reference numerals designate corresponding parts throughout the diagrams.

DETAILED DESCRIPTION

Figure 1:
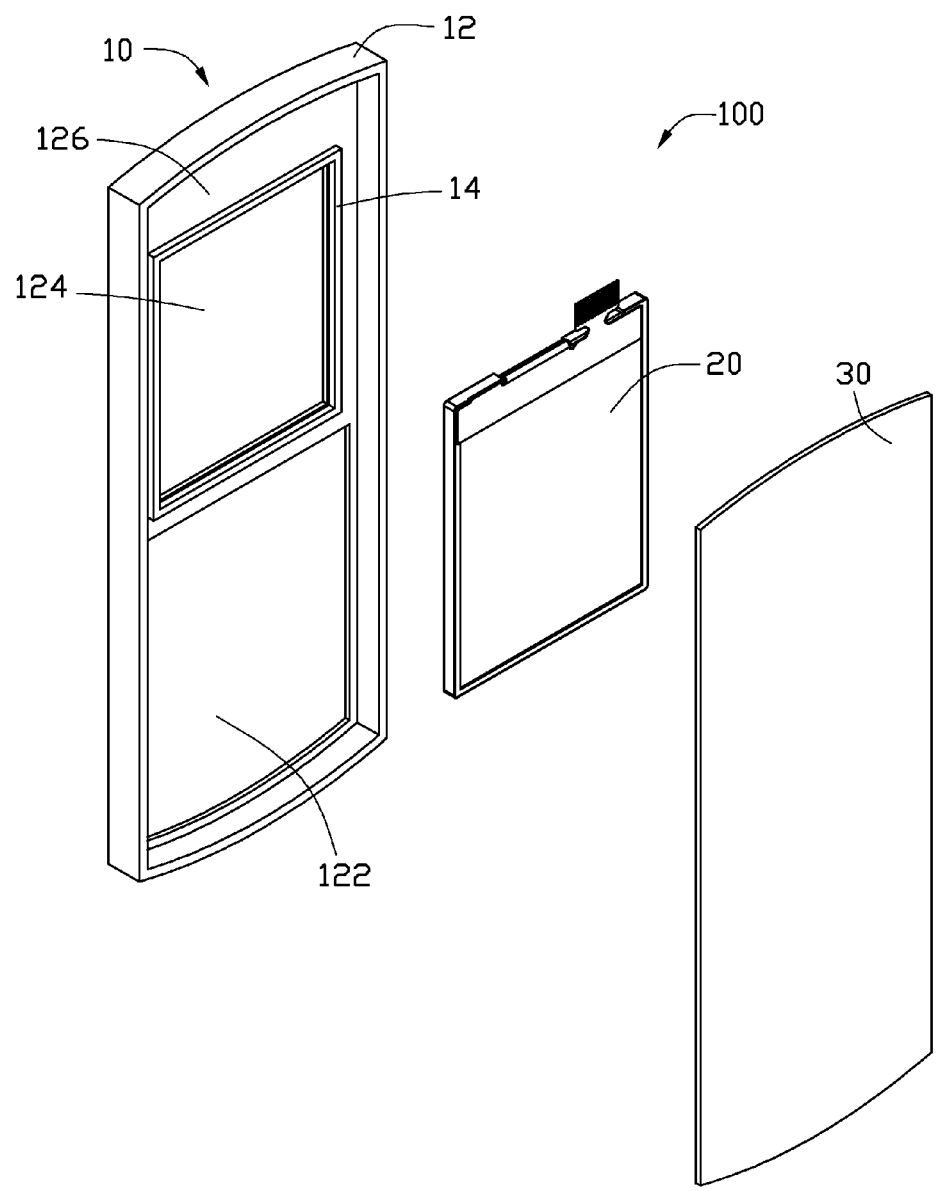
FIG. 1 is an exploded view of an electronic device according to an exemplary embodiment.
Figure 2:
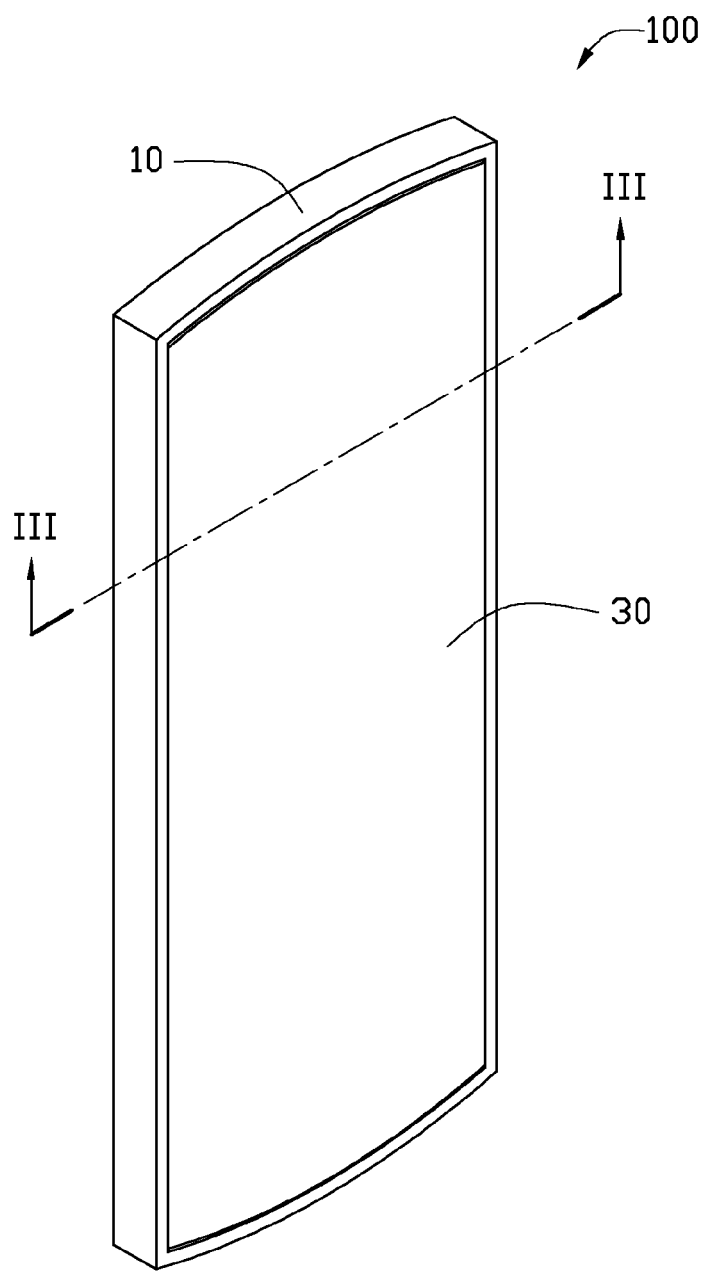
FIG. 2 is an assembled view of the electronic device shown in FIG. 1.
Figure 3:
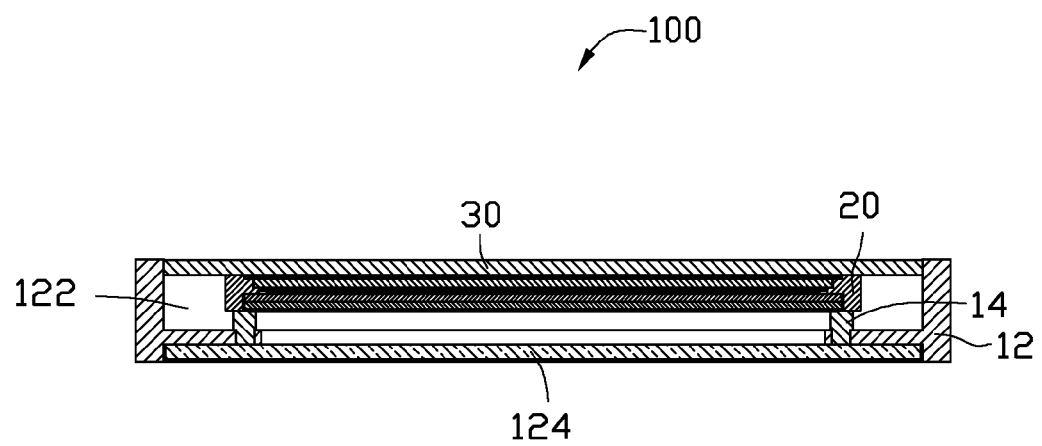
FIG. 3 is a cross-sectional view of the electronic device in FIG. 1, taken along line III-III.

FIGS. 1-3 show an exemplary electronic device 100 such as a mobile phone. The electronic device 100 includes a cover 10, a display module 20 and a printed circuit board (PCB) 30. The display module 20 is located between the cover 10 and PCB 30.

The cover 10 includes a cover body 12 and a seal gasket 14 molded on the cover body 12. The cover body 12 defines a retaining chamber 122 for retaining the display module 20 and the PCB 30. The cover body 12 includes a display window 124 embedded in the bottom wall 126 of the retaining chamber 122. The seal gasket 14 is fixed on the bottom wall 126, and the gasket 14 surrounds the display window 124.

The cover body 12 may be molded from thermosetting plastic, made of a substance or material selected from a group consisting of polyethylene, polyvinyl alcohol, polypropylene, polycarbonate, polymethyl methacrylate, acrylonitrile butadiene styrene, and polystyrene.

The seal gasket 14 may be molded from thermosetting rubber, being made from a material or substance selected from a group consisting of of thermoplastic polyurethane (TPU), polystyrene-polybutadiene-polystyrene (SBS), polystyrene-polyisoprene-polystyrene (SIS) and thermoplastic polyolefin (TPO).

A method for making the cover 10 may include the following steps:

A first injection molding machine is provided. The first injection molding machine includes a first molding chamber. Molten thermosetting plastic is injected into the first molding chamber to form the cover body 12.

A second injection molding machine is provided. The second injection molding machine includes a second molding chamber. Molten thermosetting rubber is injected into the first molding chamber to form the seal gasket 14 on the cover body 12. In this case the cover 10 has already been made.

During assembly of the electronic device 100, the display module 20 is pressed against the seal gasket 14, and the PCB 30 is pressed onto the seal gasket 14 until the seal gasket 14 is tightly retained and remains tightly retained between the display module 20 and the cover body 12.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A cover for an electronic device, comprising:
   a cover body comprising a display window; and
   a seal gasket molded with the cover body and surrounding the display window,
   wherein the seal gasket is molded from thermosetting rubber.

2. The cover as claimed in claim 1, wherein the cover body is molded from thermosetting plastic.

3. The cover as claimed in claim 2, wherein the thermosetting plastic is one or more selected from a group of polyethylene, polyvinyl alcohol, polypropylene, polycarbonate, polymethyl methacrylate, acrylonitrile butadiene styrene, and polystyrene.

4. The cover as claimed in claim 1, wherein the thermosetting rubber is one or more selected from a group of Thermoplastic polyurethanes, polystyrene-polybutadiene-polystyrene, polystyrene-polyisoprene-polystyrene and Thermoplastic polyolefin.

5. An electronic device, comprising:
   a cover comprising a cover body;
   a seal gasket molded on the cover body; and
   a display module mounted on the cover, the seal gasket retained between the cover body and the display module;
   wherein the seal gasket is molded from thermosetting rubber.

6. The electronic device as claimed in claim 5, wherein the cover body comprises a display window, the seal gasket surrounds the display window.

7. The electronic device as claimed in claim 5, wherein the cover body is molded from thermosetting plastic.

8. The electronic device as claimed in claim 7, wherein the thermosetting plastic is one or more selected from a group of polyethylene, polyvinyl alcohol, polypropylene, polycarbonate, polymethyl methacrylate, acrylonitrile butadiene styrene, and polystyrene.

9. The electronic device as claimed in claim 5, wherein the thermosetting rubber is one or more selected from a group of Thermoplastic polyurethanes, polystyrene-polybutadiene-polystyrene, polystyrene-polyisoprene-polystyrene and Thermoplastic polyolefin.

* * * * *